(12) United States Patent
Zhuang

(10) Patent No.: US 12,141,126 B2
(45) Date of Patent: *Nov. 12, 2024

(54) METHOD, APPARATUS, AND SYSTEM FOR BLOCKCHAIN CONSENSUS

(71) Applicant: ADVANCED NEW TECHNOLOGIES CO., LTD., Grand Cayman (KY)

(72) Inventor: Weiming Zhuang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 843 days.

This patent is subject to a terminal disclaimer.

(21) Appl. No.: 17/245,121

(22) Filed: Apr. 30, 2021

(65) Prior Publication Data

US 2021/0248131 A1 Aug. 12, 2021

Related U.S. Application Data

(63) Continuation of application No. 15/935,209, filed on Mar. 26, 2018, now Pat. No. 11,010,369.

(30) Foreign Application Priority Data

Mar. 29, 2017 (CN) .................. 201710197538.X

(51) Int. Cl.
*G06F 15/16* (2006.01)
*G06F 9/46* (2006.01)
(Continued)

(52) U.S. Cl.
CPC .......... *G06F 16/2379* (2019.01); *G06F 9/466* (2013.01); *G06F 9/5061* (2013.01);
(Continued)

(58) Field of Classification Search
CPC .... G06F 16/2379; G06F 9/466; G06F 9/5061; G06F 16/2365; G06F 16/285;
(Continued)

(56) References Cited

U.S. PATENT DOCUMENTS

| 7,146,353 B2 | 12/2006 | Garg et al. |
| 7,290,059 B2 | 10/2007 | Yadav |

(Continued)

FOREIGN PATENT DOCUMENTS

| CN | 106529951 A | 3/2017 |
| CN | 106530072 A | 3/2017 |

(Continued)

OTHER PUBLICATIONS

International Search Report and Written Opinion for PCT Application No. PCT/US2018/024256, mailed Jul. 9, 2018, 15 pages.

(Continued)

*Primary Examiner* — John B Walsh

(57) ABSTRACT

A blockchain consensus method may comprise: acquiring transaction data; and distributing, according to a preset distribution rule, the transaction data to at least one consensus unit in a consensus unit set, causing the at least one consensus unit to perform consensus processing on the distributed transaction data.

20 Claims, 8 Drawing Sheets

(51) Int. Cl.
*G06F 9/50* (2006.01)
*G06F 16/23* (2019.01)
*G06F 16/28* (2019.01)
*G06F 21/60* (2013.01)
*H04L 9/06* (2006.01)
*H04L 67/1012* (2022.01)
*H04L 67/60* (2022.01)

(52) U.S. Cl.
CPC ........ *G06F 16/2365* (2019.01); *G06F 16/285* (2019.01); *G06F 21/602* (2013.01); *H04L 9/0637* (2013.01); *H04L 67/1012* (2013.01); *H04L 67/60* (2022.05)

(58) Field of Classification Search
CPC . G06F 21/602; H04L 9/0637; H04L 67/1012; H04L 67/60; H04L 67/10; H04L 67/1008; H04L 67/63
See application file for complete search history.

(56) References Cited

U.S. PATENT DOCUMENTS

| | | |
|---|---|---|
| 7,543,069 B2 | 6/2009 | Hasti et al. |
| 7,827,302 B2 | 11/2010 | Weinert et al. |
| 8,230,438 B2 | 7/2012 | Kimbrel et al. |
| 8,495,604 B2 | 7/2013 | Bellows et al. |
| 9,397,985 B1 | 7/2016 | Robert et al. |
| 9,406,063 B2 | 8/2016 | Zhou et al. |
| 9,875,510 B1 | 1/2018 | Kasper |
| 10,158,527 B2 | 12/2018 | Anderson et al. |
| 10,282,457 B1 | 5/2019 | Chen et al. |
| 10,860,574 B2 * | 12/2020 | Zhuang ................ H04L 67/60 |
| 2004/0254984 A1 | 12/2004 | Dinker |
| 2006/0236324 A1 | 10/2006 | Gissel et al. |
| 2011/0179105 A1 | 7/2011 | Lindsay et al. |
| 2015/0317371 A1 | 11/2015 | Ramamurthi et al. |
| 2015/0356524 A1 | 12/2015 | Pennanen |
| 2015/0356555 A1 | 12/2015 | Pennanen |
| 2016/0012424 A1 | 1/2016 | Simon et al. |
| 2016/0117671 A1 | 4/2016 | Kalinin et al. |
| 2016/0134593 A1 * | 5/2016 | Gvili ................ H04L 63/061 713/170 |
| 2016/0217436 A1 | 7/2016 | Brama |
| 2016/0224949 A1 | 8/2016 | Thomas et al. |
| 2016/0259937 A1 | 9/2016 | Ford et al. |
| 2016/0275461 A1 | 9/2016 | Sprague et al. |
| 2016/0321654 A1 | 11/2016 | Lesavich et al. |
| 2016/0335628 A1 | 11/2016 | Weigold |
| 2016/0342977 A1 | 11/2016 | Lam |
| 2017/0011460 A1 | 1/2017 | Molinari et al. |
| 2017/0103468 A1 | 4/2017 | Orsini et al. |
| 2017/0235848 A1 | 8/2017 | Van Dusen et al. |
| 2017/0316391 A1 | 11/2017 | Peikert et al. |
| 2018/0101560 A1 | 4/2018 | Christidis et al. |
| 2018/0123882 A1 | 5/2018 | Anderson et al. |
| 2018/0349201 A1 | 12/2018 | Clark |

FOREIGN PATENT DOCUMENTS

| | | |
|---|---|---|
| CN | 106534273 A | 3/2017 |
| JP | 2009-134472 A | 6/2009 |
| JP | 5858507 B | 2/2018 |
| RU | 2584506 C1 | 5/2016 |
| TW | 201643783 A | 12/2016 |

OTHER PUBLICATIONS

Written Opinion for Singapore Application No. 11201908451U mailed Mar. 9, 2021.
Office Action for Japanese Application No. 2019-553325 mailed on Dec. 22, 2020.
Technology Innovation, Hitachi Review, vol. 99, Special Issue, Hitachi Hyoron-sha, Jan. 10, 2017, vol. 99, pp. 112-128.
Office Action for Russian Application No. 2019129090 mailed on May 15, 2020.
Examination Report No. 1 for Australian Application No. 2018243696 mailed on Jan. 30, 2020.
Baliga A. "Understanding Blockchain Consensus Models", Apr. 2017 [retrieved from internet on Jan. 20, 2020] https://www.semanticscholar.org/paper/Understanding-Blockchain-Consensus-Models-Baliga/da8a37b10bc1521a4d3de925d7ebc44bb606d740.
Alexopoulos et al., "Towards Blockchain-Based Collaborative Intrusion Detection Systems", In: D'Agostino G., Scalia A. (eds) Critical Information Infrastructures Security. CRITIS 2017. Lecture Notes in Computer Science, vol. 10707. Springer, Cham, First Online: Sep. 9, 2018.
Non-Final Rejection and Search Report for Taiwanese Application No. 106139140 mailed on Oct. 15, 2019, 11 bages.
Second Office Action for Chinese Application No. 201710197538.X mailed on Dec. 26, 2019, 3 pages.
First Search for Chinese Application No. 201710197538.X mailed on Jun. 13, 2019, 1 page.
First Office Action for Chinese Application No. 201710197538.X mailed on Jun. 26, 2019, 5 pages.
International Preliminary Report on Patentability Chapter II for PCT Application No. PCT/US2018/024256 completed on Jul. 18, 2019, 20 pages.
Written Opinion of the International Preliminary Examining Authority for Application No. PCT/US2018/024256, mailed on Mar. 15, 2019, 8 pages.
Preinterview First Office Action for U.S. Appl. No. 16/752,422, mailed on Jul. 9, 2020, 4 pages.
Notice of Allowance for U.S. Appl. No. 16/752,422, mailed on Aug. 6, 2020, 14 pages.
Non-Final Office Action for U.S. Appl. No. 15/935,209, mailed on Jul. 10, 2020, 13 pages.
Notice of Allowance for U.S. Appl. No. 15/935,209, mailed on Jan. 22, 2021, 11 pages.
Summons to attend oral proceedings pursuant to Rule 115(1) EPC for European Patent Application No. 18717795.1 mailed on Jul. 20, 2023.
Luu et al., "A Secure Sharding Protocol for Open Blockchains," Oct. 24, 2016.
Hearing Notice for Indian Application No. 201947041725 mailed on Jul. 3, 2024.

* cited by examiner

METHOD, APPARATUS, AND SYSTEM FOR BLOCKCHAIN CONSENSUS

CROSS REFERENCE TO RELATED APPLICATIONS

The present application is a continuation of and claims priority to U.S. patent application Ser. No. 15/935,209, titled "Method, Apparatus, and System for Blockchain Consensus" and filed Mar. 26, 2018, which is based on and claims priority to the Chinese Application No. 201710197538.X, filed Mar. 29, 2017. All of the above applications are incorporated herein by reference in their entirety.

TECHNICAL FIELD

The present application relates to the field of computer software technologies, and in particular, to methods, apparatuses, and systems for blockchain consensus.

BACKGROUND

Blockchain is a distributed database technology originally designed for Bitcoin. Such data structure is particularly suitable for storing sequential data that is verified within the system. Moreover, such data structure uses a consensus algorithm to ensure that the data cannot be tampered with or forged. A consensus algorithm is an algorithm that requires the participation by nodes in a blockchain and reaches consensus through joint calculation by a plurality of nodes. For example, upon receiving transaction data, a bookkeeping node broadcasts the transaction data to other participating nodes, and other participating nodes perform consensus processing to determine whether the bookkeeping node has a bookkeeping right for the transaction data. If the consensus result of other participating nodes is that the bookkeeping node has a bookkeeping right for the transaction data, the bookkeeping node stores the transaction data in a blockchain corresponding to the bookkeeping node. In the blockchain technology, therefore, the consensus algorithm is a governing law for programs or nodes in a blockchain, which ensures that all nodes can cooperate in a consistent manner in any circumstances.

Practical Byzantine Fault Tolerance (PBFT) is a common consensus algorithm in blockchain. The PBFT algorithm can provide some tolerance while ensuring activity and security, and therefore has been extensively used. In the PBFT algorithm, one node is a master node, and the other nodes are backup nodes. The master node is responsible for sorting received transaction requests, and then broadcasting the transaction requests to the backup nodes according to the sorting result. The PBFT algorithm usually comprises three phases: pre-prepare, prepare, and commit. The pre-prepare phase and the prepare phase are used to determine a sequence of transaction requests.

However, it is likely that the master node commits errors when sorting transaction requests, for example, giving the same sequence number to different transaction requests, or failing to assign a sequence number, or making sequence numbers of adjacent transaction requests to be discontinuous, etc. As a result, it is necessary for a backup node to verify the sequence of transaction requests when receiving ordered transaction requests.

As a result, the PBFT algorithm has done a lot of designs and calculations to guarantee sequence. It has been found through research that many currently used consensus algorithms (e.g., consensus mechanisms like mechanism for proving work quantity and mechanism for proving rights and benefits, etc.) need to carry out a large amount of designs and calculations on sequence when performing consensus processing, which consumes significant system resources.

In practical applications, however, there are many transaction requests with no sequence requirements. A transaction request with no sequence requirements means that, upon receiving transaction requests, a server does not need to process the received transaction requests according to an order of accepting time, such as charity donation transactions, crowdfunding transactions with no upper limit or quota, etc. With charity donation transactions as an example, the sequence of donation does not have an impact on transaction processing. Therefore, this type of transaction requests may be referred to as transaction requests that do not have sequence requirements (the "transaction request with no sequence requirements" in short). When this type of transaction requests is processed in a blockchain, the use of a current consensus algorithm will lead to a relatively low processing efficiency for this type of transactions, and at the same time, also affect the consensus throughput of the blockchain.

SUMMARY

In view of the above, embodiments of the present disclosure provide methods, apparatuses, and systems for blockchain consensus to at least mitigate the problem in the prior art that the processing efficiency is low when a consensus algorithm is used to process transaction requests with no sequence requirements.

According to one aspect, a blockchain consensus method may comprise: acquiring transaction data; and distributing, according to a preset distribution rule, the transaction data to at least one consensus unit in a consensus unit set, causing the at least one consensus unit to perform consensus processing on the distributed transaction data.

According to another aspect, a blockchain-based data storage method may comprise: receiving consensus results from different consensus units; and storing the consensus results into blocks of the blockchain according to time stamps of the consensus results.

According to another aspect, a blockchain consensus system may comprise: a distribution unit and a consensus unit set comprising a plurality of consensus units, wherein: the distribution unit is configured to acquire transaction data and distribute, according to a preset distribution rule, the transaction data to at least one consensus unit in the consensus unit set; and the at least one consensus unit is configured to perform consensus processing on the distributed transaction data.

According to another aspect, a blockchain consensus apparatus, comprising a processor and a non-transitory computer-readable storage medium storing instructions that, when executed by the processor, cause the block chain consensus apparatus to perform a method. The method may comprise: acquiring transaction data; and distributing, according to a preset distribution rule, the transaction data to at least one consensus unit in a consensus unit set, causing the at least one consensus unit to perform consensus processing on the distributed transaction data.

According to another aspect, a blockchain based data storage apparatus, comprising a processor and a non-transitory computer-readable storage medium storing instructions that, when executed by the processor, cause the block chain data storage apparatus to perform a method. The method may comprise: receiving consensus results from different consensus units; and storing, according to time stamps of the consensus results, the consensus results into blocks of the blockchain, wherein the storing the consensus results into blocks of the blockchain comprises: storing the consensus results into blocks of nodes in the blockchain network corresponding to consensus units that generate the consensus results.

The present application discloses an exemplary consensus algorithm as an independent consensus unit, which is different from a conventional blockchain consensus, forms a consensus unit set with these consensus units, and upon reception of transaction data, can distribute, according to a set distribution rule, the transaction data to consensus units in the consensus unit set to achieve consensus processing on the transaction data by the consensus units. In this way, a plurality of consensus units can perform consensus processing concurrently on a transaction request with no sequence requirements, the sequence handling by existing consensus algorithms is simplified, the processing efficiency and processing throughput on transaction requests with no sequence requirements are improved, and the operating performance of a blockchain network is improved.

BRIEF DESCRIPTION OF THE DRAWINGS

To more clearly describe technical solutions in the embodiments of the present disclosure, the accompanying drawings will be described briefly as follows. The accompanying drawings are merely exemplary. To a person skilled in the art, other drawings may be further obtained according to these drawings without inventive effort.

DETAILED DESCRIPTION

To enable a person skilled in the art to better understand the technical solutions in the present disclosure, the technical solutions in embodiments will be clearly and completely described below with reference to the accompanying drawings. Apparently, the described embodiments are merely exemplary. All other embodiments obtainable by a person skilled in the art without inventive effort and on the basis of the embodiments of the present disclosure shall be encompassed by the scope of the present disclosure.

The solutions according to the present disclosure will be described in detail through the following embodiments.

Figure 1:
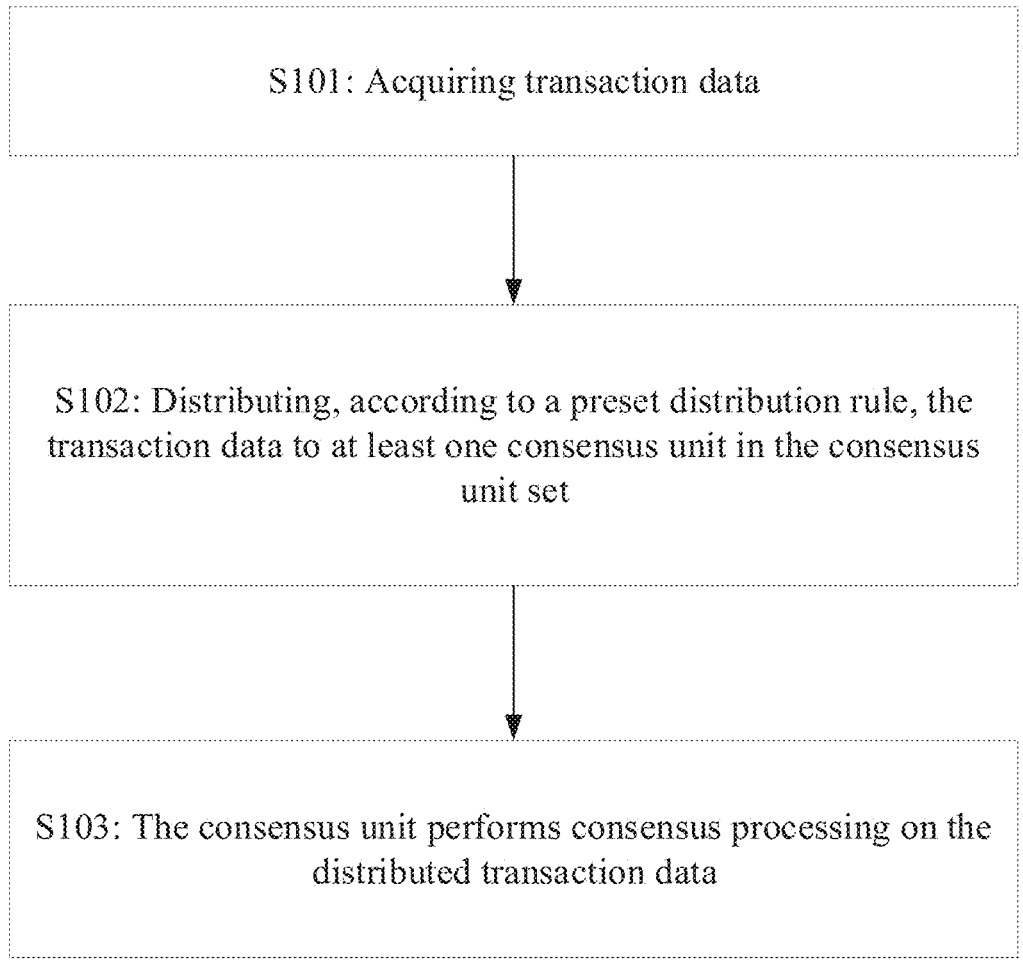
FIG. 1 is a flow chart of a blockchain consensus method according to an embodiment of the present disclosure.

FIG. 1 is a flow chart of a blockchain consensus method according to an embodiment of the present disclosure. From a perspective of programs, a main body that executes the flow may be an application (APP) or a program at a personal computer (PC) terminal. From a perspective of apparatuses, a main body that executes the flow may include, but is not limited to the following apparatuses: personal computers, large or medium scale computers, computer clusters, cell phones, tablet computers, smart wearable devices, vehicular machines, etc.

According to one embodiment, the blockchain consensus method as shown in FIG. 1 may comprise the following steps:

S101: acquiring transaction data (e.g., transaction data that seeks consensus processing in a blockchain network, and this transaction data can be referred to as "to-be-consensused" transaction data).

In one embodiment, if a main body that executes the method is a blockchain node (hereinafter the "node") in a blockchain network, the node can receive a transaction request to be processed, acquire transaction data from the transaction request, and store the transaction data. The to-be-consensused transaction data in the step S101 may be the stored transaction data. The transaction request herein may be a transaction request sent by a client terminal, for example a bookkeeping request, or a request to execute another state machine operation; or may be a transaction request sent by other apparatuses, which is not limited herein.

In some embodiments, the to-be-consensused transaction data may refer to one set of transaction data, e.g., a subsequent operation is triggered when one set of transaction data is received. Alternatively, the to-be-consensused transaction data may be a plurality sets of to-be-consensused transaction data, e.g., a subsequent operation is triggered when a plurality sets of transaction data are received. Alternatively, the to-be-consensused transaction data may be transaction data generated within a set time period, e.g., transaction data generated within a set time period is received, and when the set time period expires, a subsequent operation is triggered. The number of sets of acquired transaction data is not limited herein.

The "transaction data" herein comprises transaction data with no sequence requirements. Namely, when acquired transaction data is processed, the time factor of the transaction data is not considered. For example, a received transaction request is a donation request. Then, the to-be-consensused transaction data is the acquired to-be-consensused transaction data. For transaction data related to donation, the sequence of transaction data processing is irrelevant to the sender. Namely, the time factor of when a donation request is sent by the sender is ignored. Therefore, this type of transaction request is also referred to as a transaction request with no sequence requirements.

S102: distributing, according to a preset distribution rule, the transaction data to at least one consensus unit in the consensus unit set.

Here, the consensus unit is used to perform consensus processing on the distributed transaction data.

In a blockchain technology, a consensus algorithm is used to process the acquired transaction data, while the consensus algorithm is an algorithm that is completed by voting nodes participating in the consensus, e.g., all the voting nodes ultimately reach a consensus result through joint calculation.

The consensus unit set in one embodiment comprises consensus units, and each consensus unit may provide independent consensus transaction. In other words, different consensus units may use the same consensus algorithm, or may use different consensus algorithms.

In some embodiments, the number of consensus units comprised in a consensus unit set is not limited herein. The numbers of voting nodes comprised in different consensus units may be the same or may be different. For example, if the consensus algorithm is the PBFT algorithm, one voting node in a consensus unit comprises one primary nodes and four secondary nodes. If the consensus algorithm is the proof of work mechanism, a consensus unit comprises at least one voting node. Therefore, the number of voting nodes in a consensus unit is not limited herein, which can be determined according to actual requirements of a consensus algorithm.

In this way, with respect to to-be-consensused transaction data, consensus processing can be performed on different transaction data in a concurrent manner according to the solutions of the various embodiments. Namely, different transaction data are concurrently distributed to different consensus units, and the consensus units independently perform consensus processing on the received transaction data.

Various methods for distributing, according to a preset distribution rule, the to-be-consensused transaction data to at least one consensus unit in the consensus unit set will be described in detail below.

In one example, a first distribution method may comprise: according to the number of sets of the received to-be-consensused transaction data, determining, in a random manner, a matching number of consensus units from the consensus unit set; and distributing concurrently the to-be-consensused transaction data to the determined consensus units, respectively.

In one example, when the number of sets of the to-be-consensused transaction data is one, one consensus unit is determined, in a random manner, from the consensus unit set. The to-be-consensused transaction data is distributed to the determined consensus unit, and the consensus unit performs consensus processing on the to-be-consensused transaction data.

When the number of sets of the to-be-consensused transaction data is greater than one, according to the number of sets of the to-be-consensused transaction data, the same number of consensus units are determined, in a random manner, from the consensus unit set. The sets of to-be-consensused transaction data are distributed sequentially to the determined different consensus units, respectively.

For example, the acquired to-be-consensused transaction data comprises to-be-consensused transaction data 1, to-be-consensused transaction data 2, and to-be-consensused transaction data 3, and assuming that a consensus unit set comprises a consensus unit 1, a consensus unit 2, a consensus unit 3, a consensus unit 4, and a consensus unit 5. Here, three consensus units can be randomly determined from the consensus unit set. Assuming that the randomly determined consensus units are the consensus unit 2, the consensus unit 4, and the consensus unit 5, the to-be-consensused transaction data 1, to-be-consensused transaction data 2, and to-be-consensused transaction data 3 are sequentially distributed, in a random manner, to the determined different consensus units. For example, the to-be-consensused transaction data 1 is distributed to the consensus unit 5; the to-be-consensused transaction data 2 is distributed to the consensus unit 4; and the to-be-consensused transaction data 3 is distributed to the consensus unit 2.

The consensus distribution in an implementation mode of the present application does not have any requirement for sequence. Therefore, a random manner can be used for distribution. Further, the "to-be-consensused transaction data 1, to-be-consensused transaction data 2, and to-be-consensused transaction data 3 are sequentially distributed, in a random manner, to the determined different consensus units" may be implemented in a concurrently distributing manner. The distribution is carried out in a random manner. Namely, when to-be-consensused transaction data are acquired, any consensus unit can become a consensus unit of consensus transaction to process the to-be-consensused transaction data. Such a random distribution manner can reduce resources used by the system in distribution.

The "random manner" herein may be implemented through a random algorithm, or may be implemented in other manners, which is not specifically limited herein.

In another example, a second distribution method may comprise: determining, in a polling manner, consensus units in need of consensus transaction from the consensus unit set; and distributing the to-be-consensused transaction data to the determined consensus units.

In one example, when to-be-consensused transaction data is acquired, an inquiry message is sent, in a polling manner, to all consensus units in the consensus unit set to determine whether there is a consensus unit in need of a consensus transaction object (e.g., transaction request). When it is determined that a consensus unit is in need of a consensus transaction object, the to-be-consensused transaction data is sent to the consensus unit.

When the number of the to-be-consensused transaction data is one, an inquiry message is sent sequentially to all consensus units in the consensus unit set. When a received response message indicates that a consensus transaction object is needed, the to-be-consensused transaction data is sent to the consensus unit that returns the response message.

When the number of the to-be-consensused transaction data is greater than one, an inquiry message may be sent concurrently to all consensus units in the consensus unit set. When a response message is received, the number of consensus units in need of a consensus transaction object, as indicated in the received response message, is determined. If the number of consensus units is greater than the number of transaction requests, consensus units can be selected randomly according to the first manner from the consensus units in need of a consensus transaction object as indicated in the received response message, and the to-be-consensused transaction data is sent concurrently to the randomly selected consensus units, respectively. If the number of consensus units is not greater than the number of transaction requests, the to-be-consensused transaction data is randomly distributed to the consensus units in need of a consensus transaction object as indicated in the received response message, and the to-be-consensused transaction data that has not been distributed will continue to wait.

For example, it is determined, in a polling manner, that there are three consensus units in need of a consensus transaction object. Assume that there are four sets of acquired to-be-consensused transaction data. Then, the three sets of to-be-consensused transaction data are randomly selected from the four sets of acquired to-be-consensused transaction data. The three sets of randomly selected to-be-consensused transaction data are sent to the consensus units in need of a consensus transaction object, respectively, and the one set of to-be-consensused transaction data that has not been distributed is in a to-be-distributed state.

Assuming that there are two sets of acquired to-be-consensused transaction data, the two sets of to-be-consensused transaction data are randomly selected from the to-beconsensused transaction data determined to be in need of a consensus transaction object. The two sets of acquired to-be-consensused transaction data are concurrently sent to the randomly selected consensus units, such that the consensus units perform consensus processing on the received to-be-consensused transaction data.

In another example, a third distribution method may comprise: determining a load capacity of each consensus unit in the consensus unit set; and distributing, according to a load balancing rule, the to-be-consensused transaction data to at least one consensus unit in the consensus unit set.

In one example, when to-be-consensused transaction data are acquired, the load capacity (the load capacity here may refer to the load status of the current consensus unit, which may be different from the total load capacity of the consensus unit) of each consensus unit in the consensus unit set can be determined to ensure that the loading is balanced for all consensus units in the consensus unit set. Furthermore, the current quantity of idle resources of each consensus unit can be determined according to the load capacity of each consensus unit. In one embodiment, to-be-consensused transaction data can be distributed to consensus units in the consensus unit set that have a load capacity below a set condition. Namely, to-be-consensused transaction data are distributed to consensus units in the consensus unit set that have idle resources greater than a set threshold.

In some embodiments, with respect to the situation in which the number of consensus units in need of a consensus transaction object is greater than the number of transaction requests in the above second distribution method, the load balancing method according to the third distribution method, in addition to the random method, may be used to determine consensus units, which will not be described in detail herein.

In one embodiment, when the acquired to-be-consensused transaction data cannot be all distributed to consensus units in one time, a part of the transaction requests need to be in a to-be-distributed state. Then, for the transaction requests in a to-be-distributed state, consensus units can still be determined by using the above three distribution methods.

For example, a consensus unit set comprises three consensus units. Then, the consensus unit set can concurrently process three to-be-consensused transaction data acquired at the same time point. If four (i.e., greater than three) sets of to-be-consensused transaction data are acquired: the to-be-consensused transaction data 1, to-be-consensused transaction data 2, to-be-consensused transaction data 3, and to-be-consensused transaction data 4. Then, it is assumed that the to-be-consensused transaction data 1, to-be-consensused transaction data 2, and to-be-consensused transaction data 3 are concurrently distributed to the three consensus units in the consensus unit set, and the to-be-consensused transaction data 4 will be in a to-be-distributed state. Once it is detected that a consensus unit in the consensus unit set becomes idle, the to-be-consensused transaction data 4 can be distributed to the consensus unit.

In one embodiment, the determining consensus units from a consensus unit set comprises: determining a working state of each consensus unit in the consensus unit set, the working state comprising at least one of normal state and abnormal state; and determining consensus units from consensus units with the working state being a normal state.

To ensure that a determined consensus unit can successfully perform consensus processing on acquired to-be-consensused transaction data, the working state of consensus units in a consensus unit set can be further monitored. In such a way, when consensus units are selected, the consensus units with an abnormal working state can be avoided, which effectively improve the processing efficiency of transaction requests.

In addition, consensus units in a consensus unit set can be further provided with a switch control. In such a way, when the quantity of transaction requests to be processed in a blockchain network is relatively small, some consensus units in a consensus unit set can be turned off, which saves system resources to improve the utilization rate of the system resources. In some embodiments, by controlling the switch state of each consensus unit, the blockchain in the implementation manner of the present application can improve the system availability when facing issues like downtime or Internet disconnection. For example, when node downtime or Internet disconnection occurs to a consensus unit, the drawback of low system availability in an existing manner can be avoided by shutting down the consensus unit.

S103: the consensus unit performs (e.g., is caused to perform) consensus processing on the distributed transaction data.

In one embodiment, the consensus algorithm used by consensus units is not limited herein, which can be any consensus algorithm, including the mainstream PBFT algorithm.

A person skilled in the art should understand that there is no sequence requirement in implementation manners of the present disclosure for distributing the to-be-consensused transaction data. In this disclosure, a consensus algorithm can be designed as an independent consensus unit, different from a conventional blockchain consensus. A consensus unit set is formed by these consensus units, and upon reception of to-be-consensused transaction data, the transaction data can be distributed, according to a set distribution rule, to consensus units in the consensus unit set to achieve consensus processing on the transaction data by the consensus units. In this way, a plurality of consensus units can perform consensus processing concurrently on a transaction request with no sequence requirements, the sequence handling by existing consensus algorithms is simplified, the processing efficiency and processing throughput on transaction requests with no sequence requirements are improved, and the operating performance of a blockchain network is improved.

In some embodiments, the transaction requests may comprise transaction requests with no sequence requirements. The transaction request with no sequence requirements include, but are not limited to, charity donation transactions, crowdfunding transactions with no upper limit or quota, etc. With respect to a charity donation transaction, the sequence of donation may not have an impact on the transaction at a millisecond level, and crowdfunding transactions with no upper limit or quota may have the same nature. Therefore, this type of transaction requests can be treated as requests with no sequence requirements. In one embodiment, the operating efficiency of consensus processing can be improved in a concurrent consensus manner for this type of transaction requests with no sequence requirements. With the adoption of such a concurrent consensus manner, the throughput of the entire blockchain system is greatly improved, and in particular, a consensus algorithm module is no longer a bottleneck in the entire blockchain system.

Figure 2:
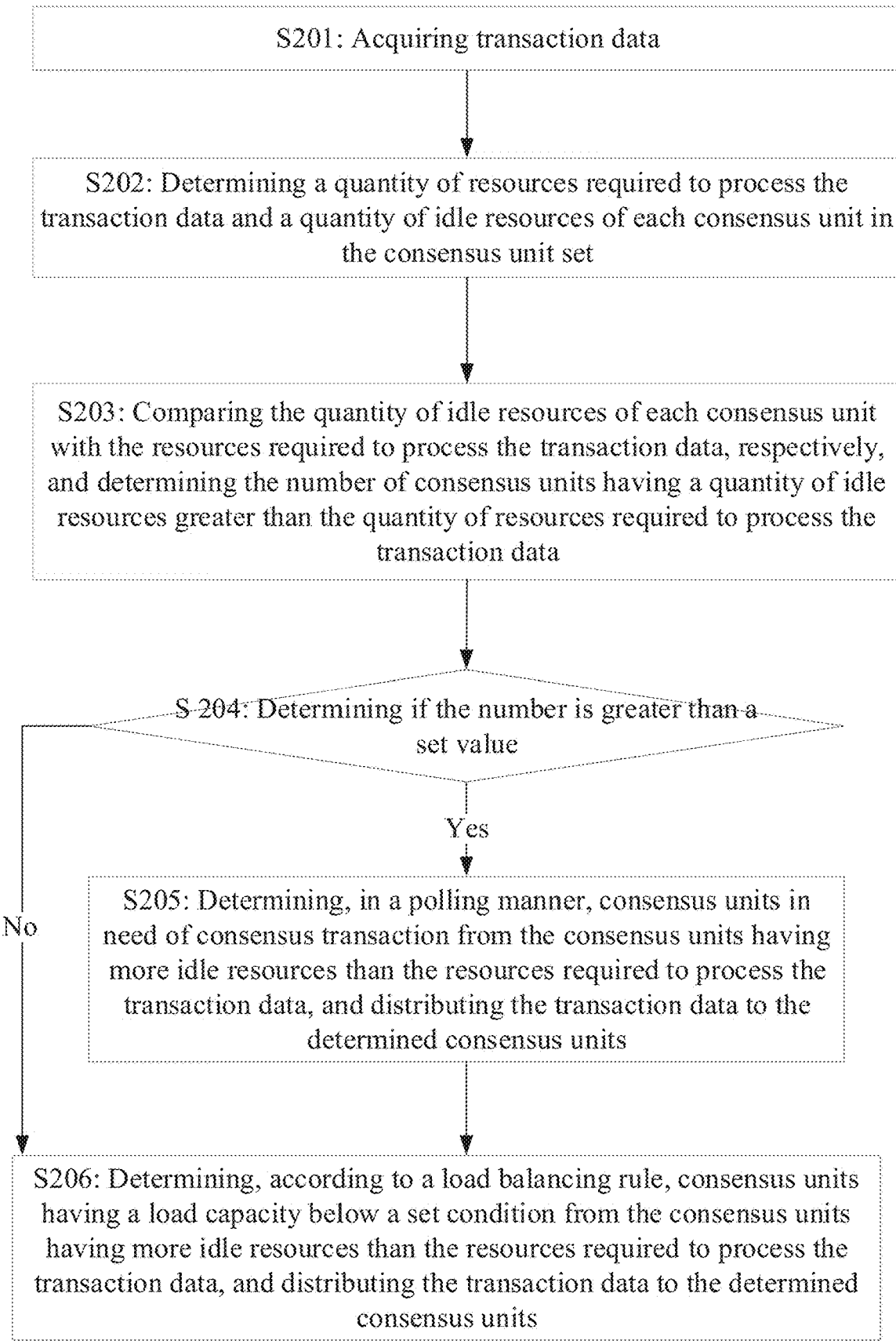
FIG. 2 is a flow chart of a blockchain consensus method according to an embodiment of the present disclosure.

FIG. 2 is a flow chart of a blockchain consensus method according to an embodiment of the present disclosure. The method may include the following steps.

S201: acquiring transaction data.

This is identical with or similar to the manner of the step S101 with reference to FIG. 1, which will not be described in detail.

S202: determining a quantity of resources required to process the transaction data and a quantity of idle resources of each consensus unit in the consensus unit set.

In one embodiment, when to-be-consensused transaction data are acquired, resources required to process the to-be-consensused transaction data can be determined.

Furthermore, a current quantity of idle resources of each consensus unit in the consensus unit set can be determined through inquiry.

S203: comparing the quantity of idle resources of each consensus unit with the resources required to process the transaction data, respectively, and determining the number of consensus units having a quantity of idle resources greater than the quantity of resources required to process the transaction data.

S204: determining if the number is greater than a set value; if yes, the method proceeds to S205; otherwise, the method proceeds to S206.

The set value in the embodiments of the present disclosure may be determined as needed, or may be determined according to experimental data, which is not limited herein.

S205: determining, in a polling manner, consensus units in need of consensus transaction from the consensus units having more idle resources than the resources required to process the transaction data, and distributing the transaction data to the determined consensus units.

The second distribution method described above with reference to the step S102 may be used here as the polling manner to determine consensus units in need of consensus transaction.

In one embodiment, a mechanism of polling and distributing each to-be-consensused transaction data is adopted. According to the polling and distributing mechanism, an adaptor or a distributing unit in charge of distribution periodically sends out a poll to sequentially poll each consensus unit whether a consensus transaction object is needed. If yes, a transaction is provided, i.e., to-be-consensused transaction data is distributed, and when the transaction is completed, the next consensus unit is polled, which is continuously repeated.

S206: determining, according to a load balancing rule, consensus units having a load capacity below a set condition from the consensus units having more idle resources than the resources required to process the transaction data, and distributing the transaction data to the determined consensus units.

The third distribution method described above with reference to the step S102 may be used as the manner here in which a load balancing rule is used to determine consensus units.

For example, there are five sets of to-be-consensused transaction data waiting for processing at a time point, while there are currently three consensus units capable of participating in the consensus transaction. Then, the loading of the transaction requests exceeds the processing capability of the independent consensus units. The loading of to-be-consensused transaction data and the processing capability of the independent consensus units are compared to provide reference for the next consensus distribution, such that each consensus unit is used to its maximum capacity and the consensus processing quantity per unit time, e.g., throughput, is improved.

In some embodiments, the load balancing distribution method used includes, but is not limited to, a software or hardware load balancing manner, for example, through DNS load balancing, gateway load balancing, or a load balancer. The distribution in a load balancing manner can prevent a lot of transaction requests from overloading some individual consensus units, while leaving other individual consensus units idled.

Compared with the distribution in a load balancing method, the polling distribution method is easier to operate, but the distribution in a load balancing method has higher efficiency.

Figure 3:
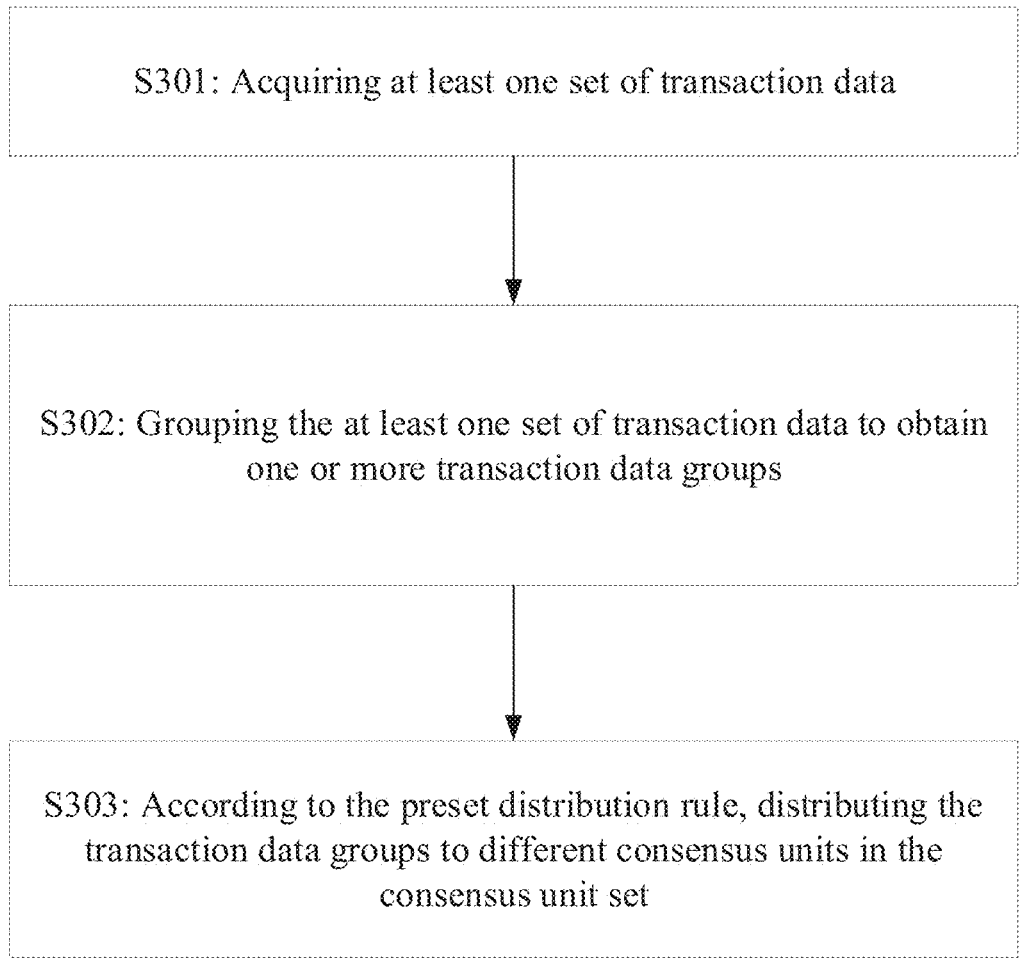
FIG. 3 is a flow chart of a blockchain consensus method according to an embodiment of the present disclosure.

FIG. 3 is a flow chart of a blockchain consensus method according to an embodiment of the present disclosure. The method may further be as follows.

S301: acquiring at least one set of transaction data.

S302: grouping the at least one transaction data to obtain one or more transaction data groups.

In one embodiment, as the to-be-consensused transaction data are transaction data with no sequence requirements, the acquired to-be-consensused transaction data can be grouped, such that the processing efficiency can be improved for the transaction data.

S303: according to the preset distribution rule, distributing (e.g., concurrently distributing) the transaction data groups to different consensus units in the consensus unit set.

Here, the consensus unit is used to perform consensus processing on the distributed to-be-consensused transaction data.

Figure 4:
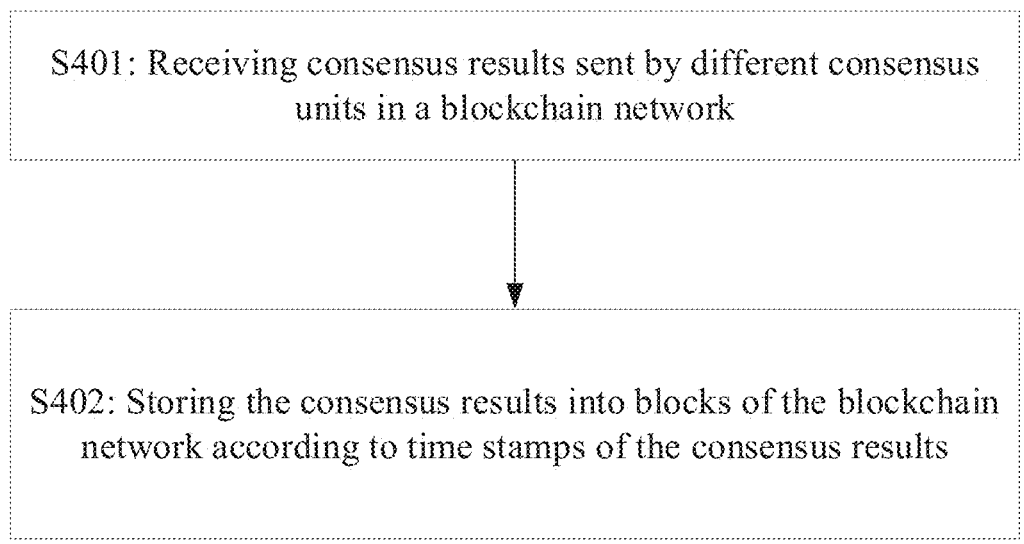
FIG. 4 is a flow chart of a blockchain based data storage method according to an embodiment of the present disclosure.

FIG. 4 is a flow chart of a blockchain based data storage method according to an embodiment of the present disclosure. The method may be as follows.

S401: receiving consensus results sent by different consensus units in a blockchain network.

In one embodiment, consensus units may have a data storage capability. When a consensus result is obtained, the consensus result just needs to be stored; they may also not have a data storage capability, then different consensus units may send the obtained consensus results to a public node, and the public node will complete storage.

S402: storing the consensus results into blocks of the blockchain network according to time stamps of the consensus results.

In one example, according to the generation time of the consensus results, the different consensus results are sequentially stored into blocks of the blockchain; alternatively, according to the reception time of the consensus results, the different consensus results are sequentially stored into blocks of the blockchain.

In one embodiment, when the consensus results are stored into blocks of the blockchain, storage nodes may be selected in a random manner; or according to a correspondence relationship between consensus units and storage nodes, the consensus results are stored into blocks of nodes in the blockchain network corresponding to consensus units that generate the consensus results, which is not limited herein. Namely, a consensus unit can store consensus results generated by itself, store consensus results generated by other consensus units, or does not store consensus results with the consensus results stored to independent storage nodes.

In one example, in addition to the provision of switch control for each consensus unit, a switch control may be further provided for a storage node. When facing the downtime of storage nodes, Internet disconnection, addition of new nodes and push-out of old nodes, such a switch control greatly improves the availability of the entire blockchain system.

Figure 5:
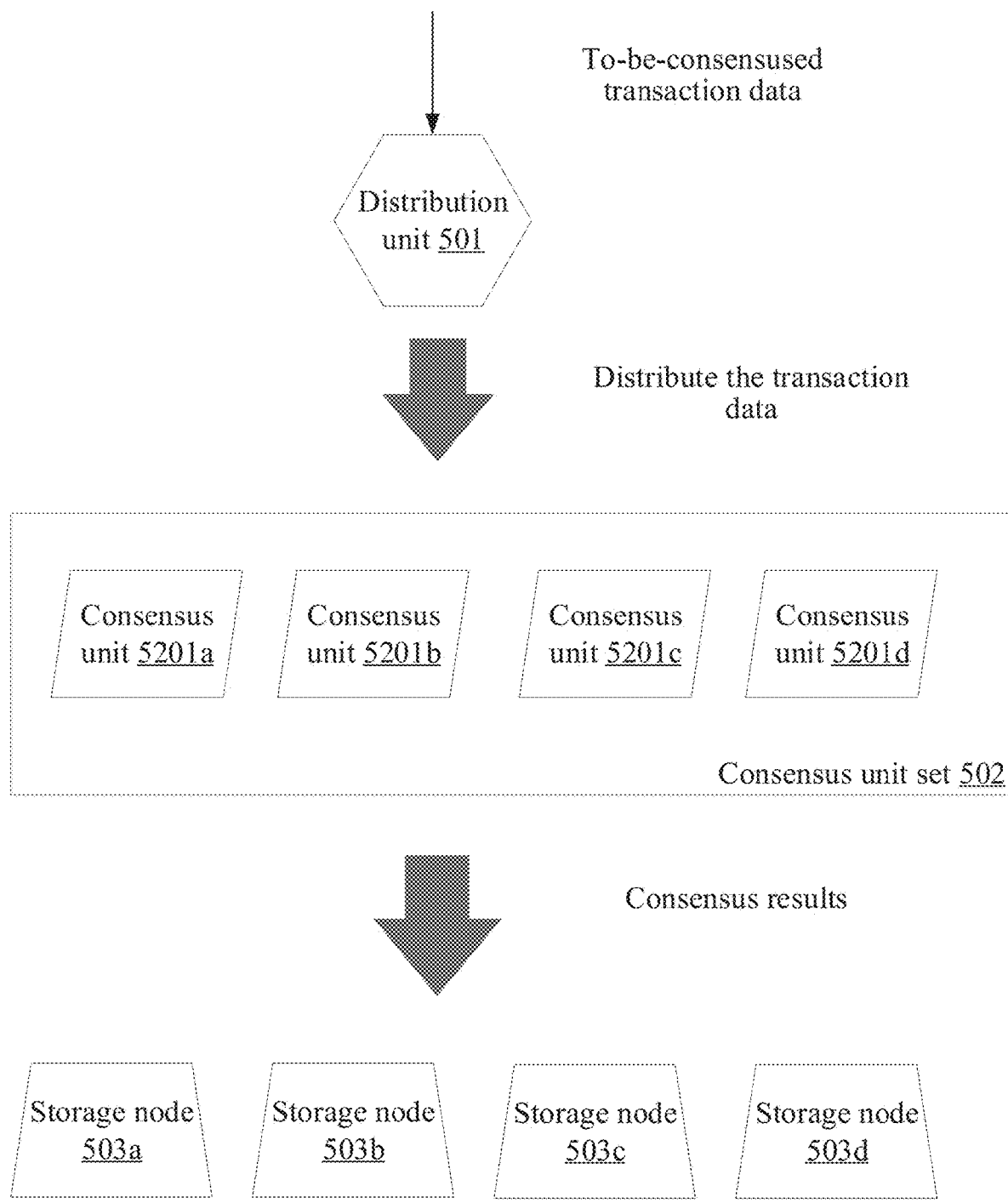
FIG. 5 is a structural schematic diagram of a blockchain consensus system according to an embodiment of the present disclosure.

FIG. 5 is a structural schematic diagram of a blockchain consensus system according to an embodiment of the present disclosure. The consensus system comprises: a distribution unit 501 and a consensus unit set 502 comprising consensus units 5021a-d, wherein: the distribution unit 501 acquires to-be-consensused transaction data and distributes, according to a preset distribution rule, the to-be-consensused transaction data to at least one consensus unit (e.g., 5021a, b, c, or d) in the consensus unit set 502; and the consensus units 5021a-d comprised in the consensus unit set 502 perform consensus processing on the distributed to-be-consensused transaction data.

In one embodiment, the consensus system further comprises one or more storage nodes 503a-d, wherein: the storage nodes 503a-d receives consensus results sent by different consensus units in a blockchain network and sequentially stores, according to time stamps of the consensus results, the consensus results.

In one embodiment, the distribution unit 501 distributing, according to a preset distribution rule, the to-be-consensused transaction data to at least one consensus unit in the consensus unit set comprises: according to the number of sets of the received to-be-consensused transaction data, determining, in a random manner, a matching number of consensus units from the consensus unit set; and distributing concurrently the to-be-consensused transaction data to the determined consensus units, respectively.

In one embodiment, the distribution unit 501 distributing, according to a preset distribution rule, the to-be-consensused transaction data to at least one consensus unit in the consensus unit set comprises: determining, in a polling manner, consensus units in need of consensus transaction from the consensus unit set; and distributing the to-be-consensused transaction data to the determined consensus units.

In one embodiment, the distribution unit 501 distributing, according to a preset distribution rule, the to-be-consensused transaction data to at least one consensus unit in the consensus unit set comprises: determining a load capacity of each consensus unit in the consensus unit set; and distributing, according to a load balancing rule, the to-be-consensused transaction data to at least one consensus unit in the consensus unit set.

In one embodiment, the distribution unit 501 distributing, according to a load balancing rule, the to-be-consensused transaction data to at least one consensus unit in the consensus unit set comprises: distributing the to-be-consensused transaction data to consensus units in the consensus unit set that have a load capacity below a set condition.

In one embodiment, the distribution unit 501 distributing, according to a preset distribution rule, the to-be-consensused transaction data to at least one consensus unit in the consensus unit set comprises: determining a quantity of resources required to process the to-be-consensused transaction data and a quantity of idle resources of each consensus unit in the consensus unit set; when the number of consensus units having a quantity of idle resources greater than the quantity of resources required to process the to-be-consensused transaction data is greater than a set value, determining, in a polling manner, consensus units in need of consensus transaction from the consensus units having more idle resources than the resources required to process the to-be-consensused transaction data, and distributing the to-be-consensused transaction data to the determined consensus units; and when the number of consensus units having a quantity of idle resources greater than the quantity of resources required to process the to-be-consensused transaction data is smaller than a set value, determining, according to a load balancing rule, consensus units having a load capacity below a set condition from the consensus units having more idle resources than the resources required to process the to-be-consensused transaction data, and distributing the to-be-consensused transaction data to the determined consensus units.

In one embodiment, the distribution unit 501 determining consensus units from the consensus unit set comprises: determining a working state of each consensus unit in the consensus unit set, the working state comprising at least one of normal state and abnormal state; and determining consensus units from consensus units with the working state being a normal state.

In one embodiment, the to-be-consensused transaction data comprises transaction data with no sequence requirements.

In one embodiment, the storage node 503 receives consensus results sent by different consensus units in a blockchain network; and stores, according to time stamps of the consensus results, the consensus results into blocks of the blockchain network.

In one embodiment, the storage node 503 storing the consensus results into blocks of the blockchain comprises: storing the consensus results into blocks of nodes in the blockchain network corresponding to consensus units that generate the consensus results.

Figure 6:
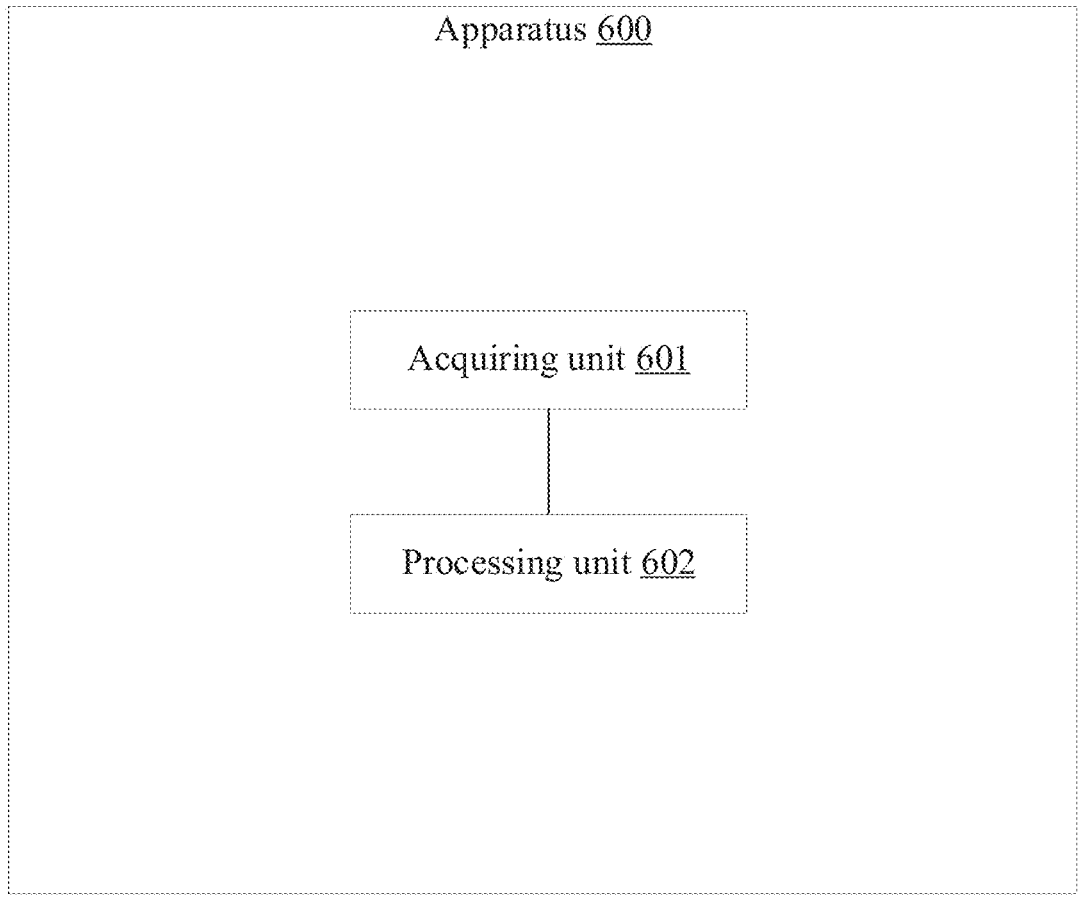
FIG. 6 is a schematic diagram of a blockchain consensus apparatus according to an embodiment of the present disclosure.

FIG. 6 is a schematic diagram of a blockchain consensus apparatus 600 according to an embodiment of the present disclosure. The consensus apparatus 600 may comprise an acquiring unit 601 and a processing unit 602, wherein: the acquiring unit 601 acquires to-be-consensused transaction data; and the processing unit 602 distributes, according to a preset distribution rule, the to-be-consensused transaction data to at least one consensus unit in the consensus unit set, and the consensus unit is configured to perform consensus processing on the distributed to-be-consensused transaction data. In some embodiments, the blockchain consensus apparatus 600 may comprise a memory and a processor coupled together. The memory may be non-transitory and computer-readable and may store instructions that, when executed by the processor, cause the apparatus 600 to perform one or more steps described herein. The instructions may be implemented as various units as described herein. Each unit may be a software, a hardware, or a combination of both.

In one embodiment, the processing unit 602 distributing, according to a preset distribution rule, the to-be-consensused transaction data to at least one consensus unit in the consensus unit set comprises: according to the number of sets of the received to-be-consensused transaction data, determining, in a random manner, a matching number of consensus units from the consensus unit set; and distributing concurrently the to-be-consensused transaction data to the determined consensus units, respectively.

In one embodiment, the processing unit 602 distributing, according to a preset distribution rule, the to-be-consensused transaction data to at least one consensus unit in the consensus unit set comprises: determining, in a polling manner, consensus units in need of consensus transaction from the consensus unit set; and distributing the to-be-consensused transaction data to the determined consensus units.

In one embodiment, the processing unit 602 distributing, according to a preset distribution rule, the to-be-consensused transaction data to at least one consensus unit in the consensus unit set comprises: determining a load capacity of each consensus unit in the consensus unit set; and distributing, according to a load balancing rule, the to-be-consensused transaction data to at least one consensus unit in the consensus unit set.

In one embodiment, the processing unit 602 distributing, according to a load balancing rule, the to-be-consensused transaction data to at least one consensus unit in the consensus unit set comprises: distributing the to-be-consensused transaction data to consensus units in the consensus unit set that have a load capacity below a set condition.

In one embodiment, the processing unit 602 distributing, according to a preset distribution rule, the to-be-consensused transaction data to at least one consensus unit in the consensus unit set comprises: determining a quantity of resources required to process the to-be-consensused transaction data and a quantity of idle resources of each consensus unit in the consensus unit set; when the number of consensus units having a quantity of idle resources greater than the quantity of resources required to process the to-be-consensused transaction data is greater than a set value, determining, in a polling manner, consensus units in need of consensus transaction from the consensus units having more idle resources than the resources required to process the to-be-consensused transaction data, and distributing the to-be-consensused transaction data to the determined consensus units; and when the number of consensus units having a quantity of idle resources greater than the quantity of resources required to process the to-be-consensused transaction data is smaller than a set value, determining, according to a load balancing rule, consensus units having a load capacity below a set condition from the consensus units having more idle resources than the resources required to process the to-be-consensused transaction data, and distributing the to-be-consensused transaction data to the determined consensus units.

In one embodiment, the processing unit 602 determining consensus units from the consensus unit set comprises: determining a working state of each consensus unit in the consensus unit set, the working state comprising at least one of normal state and abnormal state; and determining consensus units from consensus units with the working state being a normal state.

In one embodiment, the to-be-consensused transaction data comprises transaction data with no sequence requirements.

The consensus apparatus according to the various embodiments may be implemented in a software manner, or may be implemented in a hardware manner, which is not limited herein. In other words, the units 601 and 602 can be software functional units stored in a memory. When the software functional units are executed by a processor, they cause the processor to perform the described functions. The units 601 and 602 may also be hardware units, such as, programmed circuitry for performing the described functions.

Figure 7:
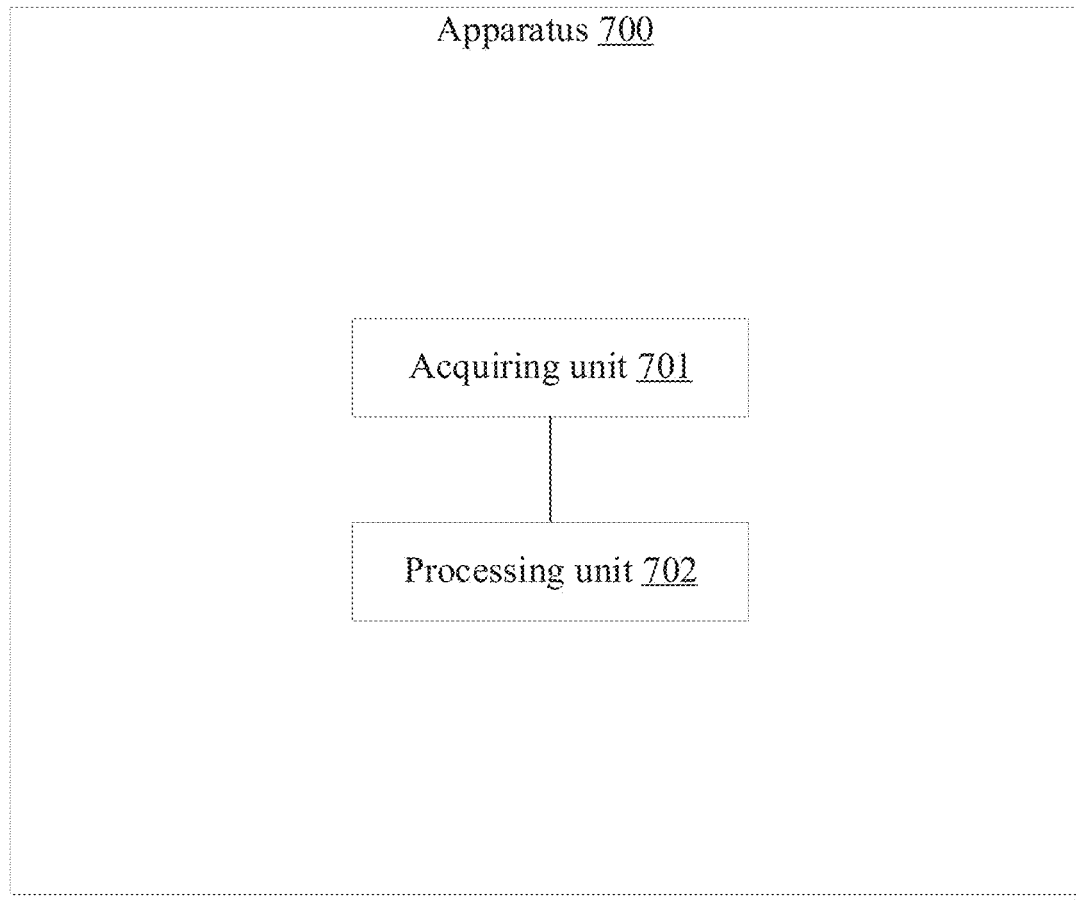
FIG. 7 is a schematic diagram of a blockchain consensus apparatus according to an embodiment of the present disclosure.

FIG. 7 is a schematic diagram of a blockchain consensus apparatus 700 according to an embodiment of the present application. The consensus apparatus 700 may comprise an acquiring unit 701 and a processing unit 702, wherein: the acquiring unit acquires at least one to-be-consensused transaction data; and the processing unit concurrently distributes, according to a preset distribution rule, the to-be-consensused transaction data to at least one consensus unit in the consensus unit set, and the consensus unit is configured to perform consensus processing on the distributed to-be-consensused transaction data. In some embodiments, the blockchain consensus apparatus 700 may comprise a memory and a processor coupled together. The memory may be non-transitory and computer-readable and may store instructions that, when executed by the processor, cause the apparatus 700 to perform one or more steps described herein. The instructions may be implemented as various units as described herein. Each unit may be a software, a hardware, or a combination of both. For example, the units 701 and 702 can be software functional units stored in a memory. When the software functional units are executed by a processor, they cause the processor to perform the described functions. The units 701 and 702 may also be hardware units, such as, programmed circuitry for performing the described functions.

In one embodiment, the processing unit 702 concurrently distributing, according to a preset distribution rule, the to-be-consensused transaction data to at least one consensus unit in the consensus unit set comprises: grouping the at least one to-be-consensused transaction data to obtain one or more transaction data groups; and according to the preset distribution rule, distributing the transaction data groups to different consensus units in the consensus unit set.

Figure 8:
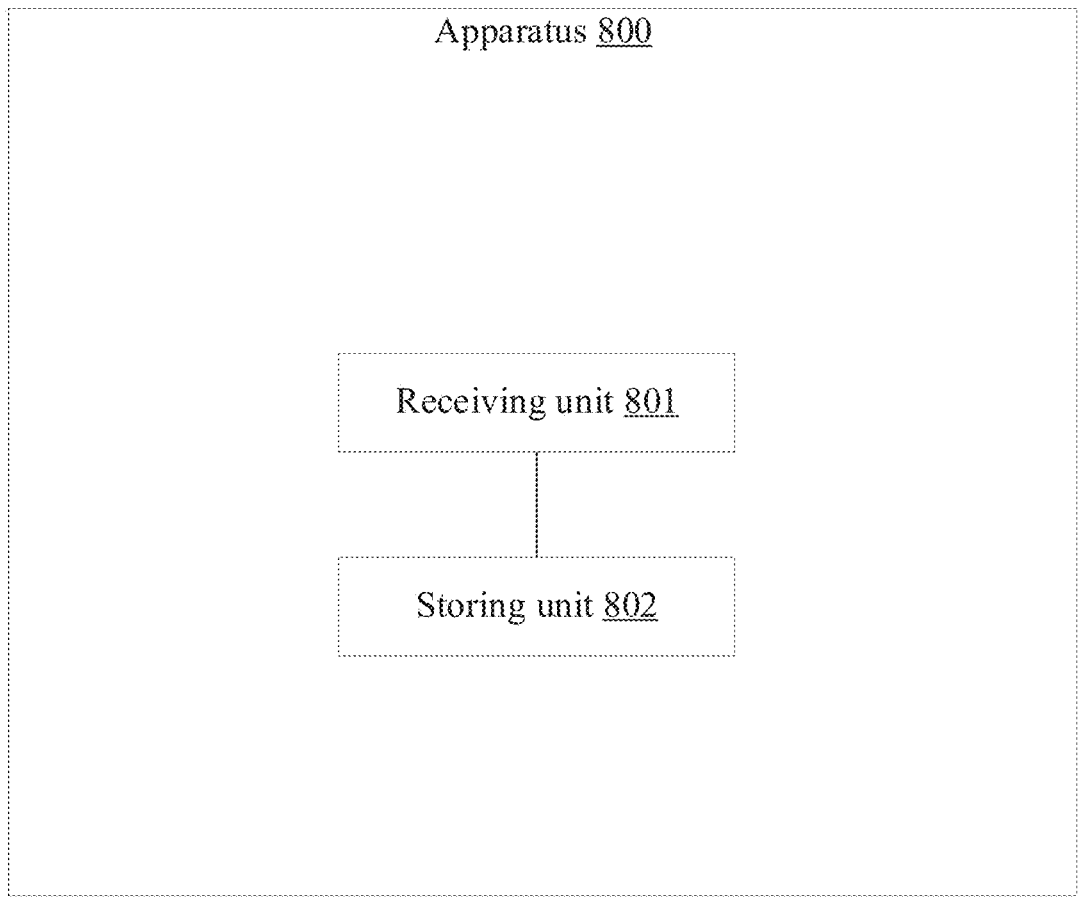
FIG. 8 is a structural schematic diagram of a blockchain based data storage apparatus according to an embodiment of the present disclosure.

FIG. 8 is a structural schematic diagram of a blockchain based data storage apparatus 800 according to an embodiment of the present application. The storage apparatus 800 may comprise a receiving unit 801 and a storing unit 802, wherein: the receiving unit 801 receives consensus results sent by different consensus units in a blockchain network; and the storing unit 802 stores, according to time stamps of the consensus results, the consensus results into blocks of the blockchain network. In some embodiments, the blockchain consensus apparatus 800 may comprise a memory and a processor coupled together. The memory may be non-transitory and computer-readable and may store instructions that, when executed by the processor, cause the apparatus 800 to perform one or more steps described herein. The instructions may be implemented as various units as described herein. Each unit may be a software, a hardware, or a combination of both. For example, the units 801 and 802 can be software functional units stored in a memory. When the software functional units are executed by a processor, they cause the processor to perform the described functions. The units 801 and 802 may also be hardware units, such as, programmed circuitry for performing the described functions.

In one embodiment, the storing unit 802 storing the consensus results into blocks of the blockchain comprises: storing the consensus results into blocks of nodes in the blockchain network corresponding to consensus units that generate the consensus results.

The consensus apparatus according to various embodiments may be implemented in a software manner, or may be implemented in a hardware manner, which is not limited herein. With respect to the consensus apparatus, a consensus algorithm is designed as an independent consensus unit, which is different from a conventional blockchain consensus. A consensus unit set is formed by these consensus units, and upon reception of to-be-consensused transaction data, the transaction data can be distributed, according to a set distribution rule, to consensus units in the consensus unit set to achieve consensus processing on the transaction data by the consensus units. In this way, a plurality of consensus units can perform consensus processing concurrently on a transaction request with no sequence requirements, the sequence handling by existing consensus algorithms is simplified, the processing efficiency and processing throughput on transaction requests with no sequence requirements are improved, and the operating performance of a blockchain network is improved.

According to the embodiments of the present disclosure, the apparatuses respectively correspond to the methods. Therefore, the apparatuses also achieve advantageous technical effects that are similar to those of the corresponding methods. As the advantageous technical effects of the methods have been described in detail above, the advantageous technical effects of the corresponding apparatuses will not be repeated herein.

In the 1990s, an improvement to a technology could be differentiated into a hardware improvement (e.g. an improvement to a circuit structure, such as a diode, a transistor, a switch, and the like) or a software improvement (an improvement to a flow of a method). Along with the technological development, however, many current improvements to method flows can be deemed as direct improvements to hardware circuit structures. Designers can obtain a corresponding hardware circuit structure by programming an improved method flow into a hardware circuit. Therefore, an improvement to a method flow can be realized by hardware implementation. For example, Programmable Logic Device (PLD) (e.g., Field Programmable Gate Array (FPGA)) is such an integrated circuit that its logic functions are determined by a user through programming the device. A designer can program to "integrate" a digital system onto one piece of PLD, without asking a chip manufacturer to design and manufacture a dedicated IC chip. At present, this type of programming has mostly been implemented through "logic compiler" software, rather than manually manufacturing the IC chips. The logic compiler software is similar to a software compiler used for program development and writing, while a particular programming language is used for writing source codes prior to compiling, which is referred to as a Hardware Description Language (HDL). There is not just one, but many types of HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language). The most commonly used HDL includes VHDL (Very-High-Speed Integrated Circuit Hardware Description Language) and Verilog. A person skilled in the art would have known obtaining a hardware circuit to implement a logic method flow by using the above HDLs to perform some logic programming on the method flow and program it into an IC.

A controller may be implemented in any proper manner. For example, a controller may be in, for example, a form of a microprocessor or processor, as well as a computer readable medium that stores computer readable program codes (e.g. software or firmware) capable of being executed by the (micro) processor, a logic gate, a switch, an Application Specific Integrated Circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. A memory controller may further be implemented as a part of a control logic of a memory. A person skilled in the art should also be aware that, in addition to that a controller is implemented in a manner of pure computer readable program codes, it is feasible to perform logic programming on steps of a method to enable a controller to implement the same functions in a form of a logic gate, a switch, an ASIC, a programmable logic controller and an embedded microcontroller. Therefore, such a controller can be deemed as a hardware part, while devices comprised therein and configured to carry out various functions may also be deemed as a structure inside the hardware part. Alternatively, devices configured to carry out various functions may be deemed as both software modules to implement a method and a structure inside a hardware part.

The system, apparatus, module or unit described in the above embodiments may be implemented by a computer chip or entity or implemented by a product having a function. A typical implementation device is a computer. For example, a computer may be a personal computer, a laptop computer, a cellular phone, a camera phone, a smart phone, a personal digital assistant, a medium player, a navigation device, an email apparatus, a game console, a tablet computer, a wearable device or a combination of any devices in these devices.

For convenience of description, the above apparatus is divided into various units according to functions for description. Functions of the units may be implemented in one or multiple pieces of software and/or hardware when implementing the present disclosure.

A person skilled in the art should understand that the embodiments of the present disclosure may be provided as a method, a system, or a computer program product. Therefore, the disclosed system may be implemented as a complete hardware embodiment, a complete software embodiment, or an embodiment combing software and hardware for performing the disclosed methods. Moreover, the disclosed system may be in the form of a computer program product implemented on one or more computer usable storage media (including, but not limited to, a magnetic disk memory, CD-ROM, an optical memory, and the like) comprising computer usable program codes therein.

The disclosed system is described with reference to flowcharts and/or block diagrams of the method, device (system) and computer program product according to the embodiments of the present disclosure. A computer program instruction may be used to implement each process and/or block in the flowcharts and/or block diagrams and a combination of processes and/or blocks in the flowcharts and/or block diagrams. These computer program instructions may be provided for a general-purpose computer, a special-purpose computer, an embedded processor, or a processor of other programmable data processing devices to generate a machine, so that the instructions executed by a computer or a processor of other programmable data processing devices generate an apparatus for implementing a specified function in one or more processes in the flowcharts and/or in one or more blocks in the block diagrams.

These computer program instructions may also be stored in a computer readable memory that can instruct a computer or other programmable data processing devices to work in a particular manner, such that the instructions stored in the computer readable memory generate a manufactured article that includes an instruction apparatus. The instruction apparatus implements one or more functions in one or more processes in the flowcharts and/or in one or more blocks in the block diagrams.

These computer program instructions may also be loaded onto a computer or other programmable data processing devices, such that a series of operational steps are performed on the computer or other programmable devices, thereby generating computer-implemented processing. Therefore, the instructions executed on the computer or other programmable devices provide steps for implementing one or more functions in one or more processes in the flowcharts and/or in one or more blocks in the block diagrams.

In a typical configuration, the computation device includes one or more Central Processing Units (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EE-PROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information accessible to a computation device. According to the definitions herein, the computer readable media do not include transitory media, such as modulated data signals and carriers.

The terms of "including", "comprising" or any other variants thereof intend to encompass a non-exclusive inclusion, such that a process, method, commodity or device comprising a series of elements not only comprises these elements, but also comprises other elements that are not listed, or further comprises elements that are inherent to the process, method, commodity or device. When there is no further restriction, elements defined by the statement "comprising one . . . " does not exclude additional similar elements in a process, method, commodity or device that comprises the defined elements.

The present disclosure may be described in a regular context of a computer executable instruction that is executed by a computer, such as a program module. In various embodiments, the program module comprises a routine, a program, an object, a component, a data structure, and the like for executing a particular task or implementing a particular abstract data type. The present disclosure may also be practiced in distributed computing environments. In these distributed computing environments, remote processing devices connected via communication networks carry out tasks. In the distributed computing environments, a program module can be located in local and remote computer storage media, including storage devices.

The embodiments in this description are described in a progressive manner with each embodiment focusing on differences from other embodiments, and the embodiments may be mutually referenced for identical or similar parts thereof. For the system embodiment, the description thereof is relatively simple as it is substantially similar to the method embodiment. The description of the method embodiment may be referenced for related parts thereof.

The embodiments of the present disclosure are merely exemplary, and are not used to limit the present disclosure. To a person skilled in the art, the disclosed embodiments can be modified or changed in various ways. Any modification, equivalent substitution or improvement made within the spirit and principle of the present disclosure shall be encompassed by the claims of the present disclosure.

The invention claimed is:

1. A method, comprising:
acquiring, by a blockchain node of a blockchain network, transaction data from multiple transaction requests for consensus processing in the blockchain network, the acquired transaction data comprising first transaction data of a first transaction request of the transaction requests and second transaction data of a second transaction request of the transaction requests, the first transaction request having no sequence requirements, and the first transaction request not requiring processing according to a time factor of when the first transaction request was sent by a sender relative to other transaction requests acquired for consensus processing;
determining, by the blockchain node, multiple consensus units of the blockchain network to distribute the acquired transaction data to, the multiple consensus units including a first consensus unit and a second consensus unit; and
after determining the multiple consensus units to distribute the transaction data to, distributing, by the blockchain node, without considering the time factor, the first transaction data to the first consensus unit and the second transaction data to the second consensus unit, causing the first consensus unit and the second consensus unit to perform consensus processing on the first transaction data and the second transaction data without considering the time factor.

2. The method according to claim 1, wherein: determining, by the blockchain node, the multiple consensus units of the blockchain network to distribute the acquired transaction data to, comprises:
grouping the acquired transaction data into multiple groups of transaction data, the multiple groups of transaction data comprising a first transaction data group comprising the first transaction data and a second transaction data group comprising the second transaction data; and
distributing the multiple groups of transaction data to different consensus units of the multiple consensus units.

3. The method according to claim 1, wherein: determining, by the blockchain node, the multiple consensus units of the blockchain network to distribute the acquired transaction data to, comprises: determining, according to a number of sets of the acquired transaction data, in a random manner, a matching number of consensus units in the blockchain network.

4. The method according to claim 1, wherein: determining, by the blockchain node, the multiple consensus units of the blockchain network to distribute the acquired transaction data to, comprises: determining, by sequentially polling consensus units of the blockchain network, that each of the multiple consensus units is in need of a consensus transaction.

5. The method according to claim 1, wherein: determining, by the blockchain node, the multiple consensus units of the blockchain network to distribute the acquired transaction data to, comprises:
determining a load capacity of each of the multiple consensus units; and
determining that the load capacity of each of the multiple consensus units is below a set condition.

6. The method according to claim 1, wherein: determining, by the blockchain node, the multiple consensus units of the blockchain network to distribute the transaction data to, comprises:
- determining a quantity of resources required to process the acquired transaction data;
- determining a number of consensus units in a set of consensus units in the blockchain network that have a quantity of idle resources that is no less than the quantity of resources required to process the acquired transaction data; and
- determining from the set of consensus units, based on the number, the multiple consensus units to distribute the transaction data to by:
  - when the number is greater than a threshold, polling the consensus units of the set to determine which of the consensus units is in need of a consensus transaction; and
  - when the number is less than or equal to the threshold, determining which of the consensus units of the set has a load capacity below a set condition.

7. The method according to claim 1, wherein: determining, by the blockchain node, the multiple consensus units of the blockchain network to distribute the acquired transaction data to, comprises:
- determining whether each consensus unit in a set of consensus units in the blockchain network has a normal working state or an abnormal working state; and
- determining, from the set of consensus units, the multiple consensus units to distribute the transaction data to by determining that each of the multiple consensus units has the normal working state.

8. The method of claim 1, wherein:
- the time factor of when the first transaction request was sent is a first time factor;
- the second transaction request has no sequence requirements, and the second transaction request does not require processing according to a second time factor of when the second transaction request was sent by a sender relative to other transaction requests acquired for consensus processing; and
- distributing the first transaction data to the first consensus unit and the second transaction data to the second consensus unit, comprises: distributing, by the blockchain node, without considering any of the first time factor and the second time factor, the first transaction data to the first consensus unit and the second transaction data to the second consensus unit, causing the first consensus unit and the second consensus unit to perform consensus processing on the first transaction data and the second transaction data without considering any of the first time factor and the second time factor.

9. The method of claim 8, wherein each of the first transaction request and the second transaction request comprises a charity donation transaction or a crowdfunding transaction with no upper limit or quota.

10. The method of claim 1, wherein after the first transaction data and the second transaction data are distributed, the first consensus unit and the second consensus unit concurrently perform consensus processing on the first transaction data and the second transaction data, respectively.

11. The method of claim 1, further comprising:
- receiving, from the multiple consensus units, consensus results from processing the first transaction data and the second transaction; and
- storing the consensus results into one or more blocks of the blockchain network according to time stamps of the consensus results.

12. A non-transitory computer-readable storage medium storing instructions that, when executed by a processor, cause the processor to perform operations comprising:
- acquiring transaction data from multiple transaction requests for consensus processing in a blockchain network, the acquired transaction data comprising first transaction data of a first transaction request of the transaction requests and second transaction data of a second transaction request of the transaction requests, the first transaction request having no sequence requirements, and the first transaction request not requiring processing according to a time factor of when the first transaction request was sent by a sender relative to other transaction requests acquired for consensus processing;
- determining multiple consensus units of the blockchain network to distribute the acquired transaction data to, the multiple consensus units including a first consensus unit and a second consensus unit; and
- after determining the multiple consensus units to distribute the transaction data to, distributing, without considering the time factor, the first transaction data to the first consensus unit and the second transaction data to the second consensus unit, causing the first consensus unit and the second consensus unit to perform consensus processing on the first transaction data and the second transaction data without considering the time factor.

13. The non-transitory computer-readable storage medium according to claim 12, wherein: determining the multiple consensus units of the blockchain network to distribute the acquired transaction data to, comprises:
- grouping the acquired transaction data into multiple groups of transaction data, the multiple groups of transaction data comprising a first transaction data group comprising the first transaction data and a second transaction data group comprising the second transaction data; and
- distributing the multiple groups of transaction data to different consensus units of the multiple consensus units.

14. The non-transitory computer-readable storage medium according to claim 12, wherein: determining the multiple consensus units of the blockchain network to distribute the acquired transaction data to, comprises: determining, according to a number of sets of the acquired transaction data, in a random manner, a matching number of consensus units in the blockchain network.

15. The non-transitory computer-readable storage medium according to claim 12, wherein: determining the multiple consensus units of the blockchain network to distribute the acquired transaction data to, comprises: determining, by sequentially polling consensus units of the blockchain network, that each of the multiple consensus units is in need of a consensus transaction.

16. The non-transitory computer-readable storage medium according to claim 12, wherein: determining the multiple consensus units of the blockchain network to distribute the acquired transaction data to, comprises:
- determining a load capacity of each of the multiple consensus units; and
- determining that the load capacity of each of the multiple consensus units is below a set condition.

17. The non-transitory computer-readable storage medium according to claim 12, wherein: determining the multiple consensus units of the blockchain network to distribute the transaction data to, comprises:
- determining a quantity of resources required to process the acquired transaction data;
- determining a number of consensus units in a set of consensus units in the blockchain network that have a quantity of idle resources that is no less than the quantity of resources required to process the acquired transaction data; and
- determining from the set of consensus units, based on the number, the multiple consensus units to distribute the transaction data to by:
  - when the number is greater than a threshold, polling the consensus units of the set to determine which of the consensus units is in need of a consensus transaction; and
  - when the number is less than or equal to the threshold, determining which of the consensus units of the set has a load capacity below a set condition.

18. The non-transitory computer-readable storage medium according to claim 12, wherein: determining the multiple consensus units of the blockchain network to distribute the acquired transaction data to, comprises:
- determining whether each consensus unit in a set of consensus units in the blockchain network has a normal working state or an abnormal working state; and
- determining, from the set of consensus units, the multiple consensus units to distribute the transaction data to by determining that each of the multiple consensus units has the normal working state.

19. The non-transitory computer-readable storage medium of claim 12, wherein:
- the time factor of when the first transaction request was sent is a first time factor;
- the second transaction request has no sequence requirements, and the second transaction request does not require processing according to a second time factor of when the second transaction request was sent by a sender relative to other transaction requests acquired for consensus processing; and
- distributing the first transaction data to the first consensus unit and the second transaction data to the second consensus unit, comprises: distributing, without considering any of the first time factor and the second time factor, the first transaction data to the first consensus unit and the second transaction data to the second consensus unit, causing the first consensus unit and the second consensus unit to perform consensus processing on the first transaction data and the second transaction data without considering any of the first time factor and the second time factor.

20. A system, comprising:
one or more processors; and
one or more memories storing instructions that, when executed by the one or more processors, cause the one or more processors to perform operations comprising:
- acquiring transaction data from multiple transaction requests for consensus processing in a blockchain network, the acquired transaction data comprising first transaction data of a first transaction request of the transaction requests and second transaction data of a second transaction request of the transaction requests, the first transaction request having no sequence requirements, and the first transaction request not requiring processing according to a time factor of when the first transaction request was sent by a sender relative to other transaction requests acquired for consensus processing;
- determining multiple consensus units of the blockchain network to distribute the acquired transaction data to, the multiple consensus units including a first consensus unit and a second consensus unit; and
- after determining the multiple consensus units to distribute the transaction data to, distributing, without considering the time factor, the first transaction data to the first consensus unit and the second transaction data to the second consensus unit, causing the first consensus unit and the second consensus unit to perform consensus processing on the first transaction data and the second transaction data without considering the time factor.

* * * * *